United States Patent [19]

Shimbara

[11] Patent Number: 4,848,181
[45] Date of Patent: Jul. 18, 1989

[54] PIVOTAL ATTACHING DEVICE FOR LINKAGE CAM LEVER

[75] Inventor: Sakuzo Shimbara, Yokohama, Japan
[73] Assignee: Nifco Inc., Kanagawa, Japan
[21] Appl. No.: 153,960
[22] Filed: Feb. 9, 1988

[30] Foreign Application Priority Data

Feb. 16, 1987 [JP] Japan ............................. 62-19984

[51] Int. Cl.⁴ ............................................. G05G 1/04
[52] U.S. Cl. ....................................... 74/523; 403/161; 403/388
[58] Field of Search ................ 74/523, 524, 525, 528; 403/306, 329, 116, 161, 163, 388; 24/535, 545, 563, 542, 487

[56] References Cited

U.S. PATENT DOCUMENTS

| 966,325 | 8/1910 | Gilbert | 74/523 X |
| 1,919,471 | 7/1933 | Kootz | 403/161 X |
| 3,803,941 | 4/1974 | Yoshikawa | 74/523 |
| 3,842,687 | 10/1974 | Fansler et al. | 403/116 X |
| 4,018,104 | 4/1977 | Bland et al. | 403/116 |
| 4,030,378 | 6/1977 | Kroesser | 403/116 |
| 4,261,076 | 4/1981 | Clemens | 74/523 X |
| 4,266,441 | 5/1981 | Stordeur | 74/523 |
| 4,337,764 | 7/1982 | Lerman | 403/116 X |
| 4,353,265 | 10/1982 | Lipshield | 74/523 X |
| 4,371,355 | 2/1983 | Baumann | 403/289 X |
| 4,456,219 | 6/1984 | Scott et al. | 74/523 X |
| 4,730,509 | 3/1988 | Hornady | 74/523 X |

FOREIGN PATENT DOCUMENTS

| 255592 | 2/1949 | Switzerland | 74/523 |
| 254237 | 7/1926 | United Kingdom | 74/523 |
| 862992 | 3/1961 | United Kingdom | 74/523 |
| 1519583 | 8/1978 | United Kingdom | 403/383 |

OTHER PUBLICATIONS

McGraw Hill, Dictionary of Scientific & Technical Terms, p. 834, (1976).

Primary Examiner—Vinh Luong
Attorney, Agent, or Firm—Richard Bushnell

[57] ABSTRACT

A pivotal attaching device for a linkage cam lever which is pivotally attached to one end of a rod so that a lever can be pivoted by a shaft. The device is comprised of a securing portion for securing the shaft to one end of the rod, and a forked leaf spring portion including a pair of integrally formed spring pieces connected to the securing portion and maintaining a space therebetween. The securing portion and forked leaf spring portion are integrally molded of plastic with formed openings for receiving and securing the end of the rod, and further including receiving and securing the end of the rod, and further including integral clip portions to maintain the device in a secure fashion around the end of the rod.

4 Claims, 3 Drawing Sheets

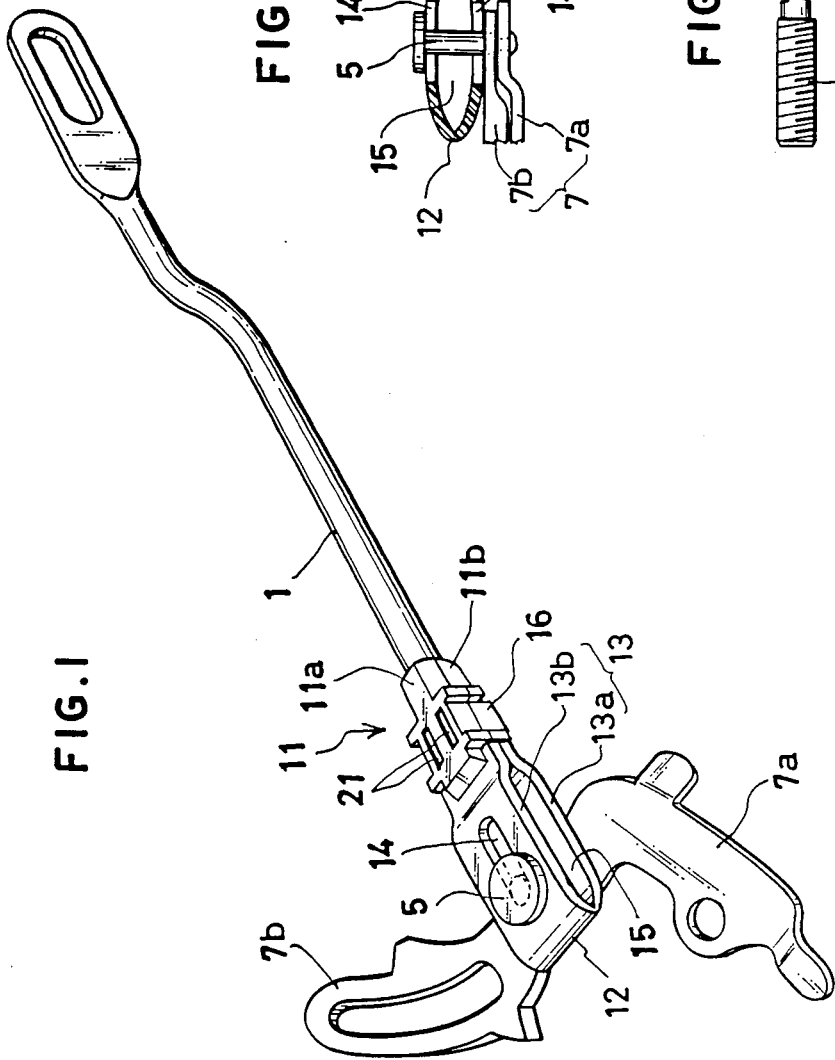

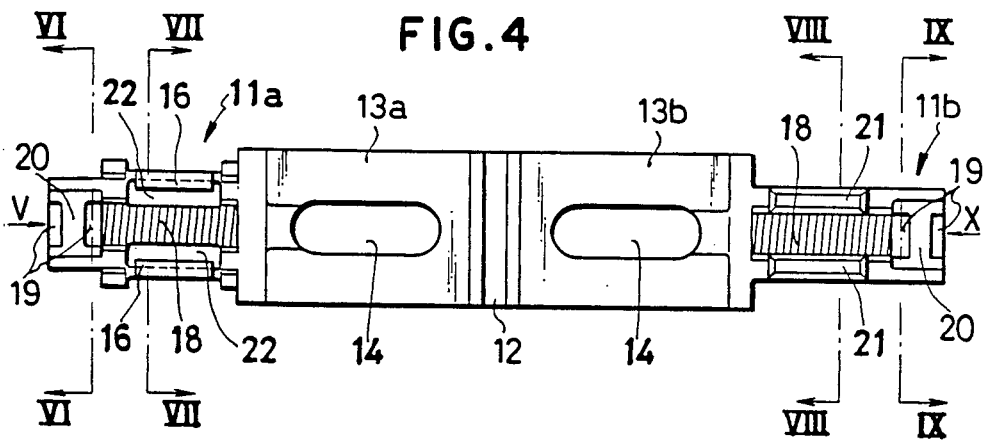
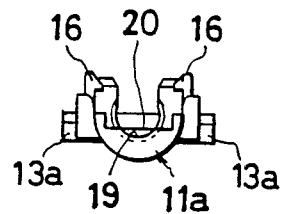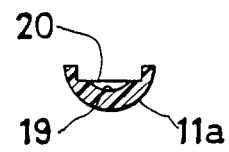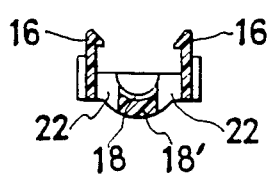
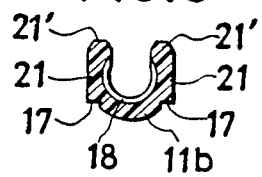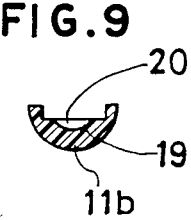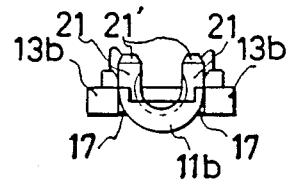
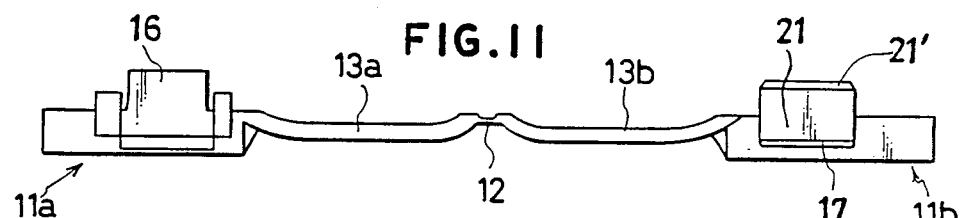
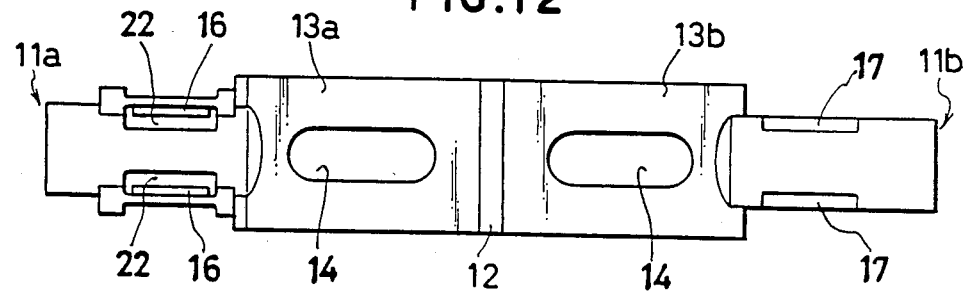

PIVOTAL ATTACHING DEVICE FOR LINKAGE CAM LEVER

BACKGROUND OF THE INVENTION

1. Field of the Invention

This invention relates to a pivotal attaching device for a linkage cam lever, and more particularly to a pivotal attaching device for swingably connecting a second member or cam lever to one end of a first member or rod in a rod-type linkage usable in various applications for enabling a force applied to an operating piece mounted on the outer surface of a door of, for example, a vehicle, a refrigerator, a freezer, etc., to be transmitted to a lock of the door for unlocking the same.

2. Prior Art Statement

A prior art device for pivotally attaching a second member or cam lever to one end of a first member or rod in a rod linkage is shown in FIGS. 16 and 17. As shown, a flat portion 3 having an opening 2 is formed at one end portion of a metal rod 1 by pressing. Then, a cylindrical portion of a grommet washer 4 made of plastic is inserted into the opening 2 from one side and a metal shaft 5 having a head portion is thrust into the washer 4 from the other side of the opening 2. Then, a coil spring 6 and a cam lever 7 are attached to the shaft 5. Thereafter, the edge portion of the shaft 5 is enlarged by calking so as to prevent the coil spring 6 and cam lever 7 from escaping from the shaft. Then, the coil spring 6 is compressed between a flange portion of the grommet washer 4 and the cam lever 7 to prevent loosening of the lever 7. In order to make an arrangement whereby a lock can be unlocked only after the operating piece is pivoted to some extent as in the case of the door of a vehicle, the opening 2 in the flat portion 3 is formed in a elongated shape extending in the longitudinal direction of the rod 1, as illustrated, and the cylindrical portion of the grommet washer 4 is slidable along the elongated opening 2. The cam lever 7 may comprise a plurality of lever pieces instead of a single piece, for example, two pieces 7a and 7b as seen in the illustrated example. In the illustrated example, one lever piece 7a is swingably mounted on the vehicle body in such a fashion as to pivot about a point located away from the shaft 5, whereas the other lever piece 7b undertakes the locking operation. In general, the upper lever 7b is made of plastic in order to prevent the generation of noise.

The plastic grommet washer 4 is used to prevent the generation of noise caused by direct contact between the metal rod 1 and the metal shaft 5, whereas the coil spring 6 is employed in order to prevent the shaft 5 from loosening in the thrusting direction and also to render a cushioning function so that the rod 1 can be moved without trouble even if a certain amount of twisting force is applied thereto when the rod 1 is pushed or pulled. However, since the conventional device must be provided with the grommet washer 4 and coil spring 6, the number of component parts becomes large, resulting in high cost.

OBJECT AND SUMMARY OF THE INVENTION

It is therefore the object of the present invention to provide a pivotal attaching device for cam lever, in which the number of component parts is small, the assembling work is easy, and the cam lever can be smoothly operated.

In order to achieve the above object, there is essentially provided a pivotal attaching device for a second member or cam lever linkage which is pivotally attached to one end of a first member or rod so that a lever can be swung by a shaft, the device comprising a securing portion for securing the shaft to one end of the rod, and a forked leaf spring portion including a pair of spring pieces connected to the securing portion and maintaining a space therebetween, the securing portion and forked leaf spring portion being integrally molded of plastic, the pair of spring pieces each being formed with an opening for permitting the shaft to be thrust therein.

In the pivotal attaching device for a cam lever having the above-mentioned constitution, one end of the rod is secured to the securing portion, then a shaft having a head is pushed into the openings formed in the pair of spring pieces of the forked leaf spring portion, the leading end portion of the shaft is fitted into the openings of the cam lever, and then the leading end portion of the shaft is enlarged by calking in order to make the space between the pair of leaf springs slightly narrower and to prevent the shaft from escaping from the openings.

Since the pivotal attaching device according to the present invention comprises one component part integrally molded of plastic, the handling is easy and no noise is generated even if the device contacts the metal shaft.

The above and other objects and features of the invention will become more apparent from the following detailed description with reference to the accompanying drawings.

BRIEF DESCRIPTION OF THE DRAWINGS

FIG. 1 is a perspective view showing a first member or rod and a second member or cam lever which are pivotably attached together by a pivotal attaching device for a cam lever according to the present invention;

FIG. 2 is a partial cross-section, parallel to the major axis of the rod and the shaft, through the device shown in FIG. 1;

FIG. 3 is a side view of a part of the rod of FIG. 1;

FIG. 4 is a plan view showing a development of the pivotal attaching device of FIG. 1;

FIG. 5 is an end view of the device of FIG. 4 as viewed from the direction as shown by an arrow V in FIG. 4;

FIG. 6 is a sectional view taken along line VI—VI of FIG. 4;

FIG. 7 is a sectional view taken along line VII—VII of FIG. 4;

FIG. 8 is a sectional view taken along line VIII—VIII of FIG. 4;

FIG. 9 is a sectional view taken along line IX—IX of FIG. 4;

FIG. 10 is an end view of the device of FIG. 4 as viewed from the direction as shown by an arrow X in FIG. 4;

FIG. 11 is a side view of a development of the pivotal attaching device of FIG. 1;

FIG. 12 is a bottom view of the development of the pivotal attaching device of FIG. 1;

DETAILED DESCRIPTION OF THE PREFERRED EMBODIMENT

Figure 13:
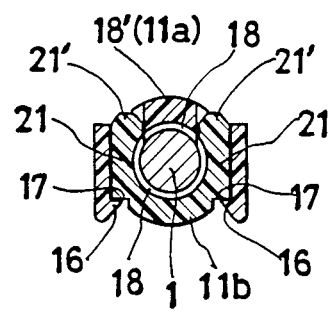
FIG. 13 is a sectional view taken along line XIII—XIII of FIG. 2.

FIGS. 1 through 13 illustrate one embodiment of a pivotal attaching device for a cam lever according to the present invention. In the figures, 11 denotes a securing portion, 13 a forked leaf spring portion including a pair of spring pieces 13a and 13b, and 14 denotes openings formed one in each pair of spring pieces 13a and 13b. The securing portion 11 and forked leaf spring portion 13 are integrally molded of plastic as will be described.

The securing portion 11 has a cylindrical shape which is larger than that of a rod 1 to which the portion 11 is to be secured. Each of the spring pieces 13a and 13b is curved. When a pair of spring pieces 13a and 13b are brought to face each other, a space 15 is defined therebetween.

The securing portion 11 of this pivotal attaching device comprises two members 11a and 11b each having a generally cylindrical shape. As shown in FIGS. 5 and 7, one member 11a is provided with a pair of snap catches 16 at laterally opposite positions, whereas, as shown in FIGS. 8 and 10, the other member 11b is provided at laterally opposite positions with a pair of retaining portions 17 for engaging with the snap catches 16.

As shown in FIGS. 4, 11 and 12, one end of the spring piece 13a of the forked leaf spring portion 13 is connected with the member 11a, whereas one end of the other spring piece 13b is connected with the other member 11b. The other ends of the spring pieces 13a and 13b are integrally molded of plastic so that the pieces 13a and 13b are connected with each other through a thin portion 12 as a hinge. The molded product is folded in two along the thin portion 12 to bring the members 11a and 11b face-to-face with each other. At this time, the spring pieces 13a and 13b also face each other. Then, the members 11a and 11b are pressure welded. As a result, the snap catches 16 are engaged with the retaining portions 17. As a result, the securing portion 11 and spring portion 13 are integrally molded.

In this embodiment, as shown in FIG. 3, the leading end portion of the rod 1 is formed by forging to have a larger outer diameter than that of the rod 1 and this large diameter portion is provided with a male screw 1a. The rod 1 is also formed with a flat portion 1b slightly behind the male screw 1a by pressing.

In order to hold the rod 1, the opposite surfaces of the members 11a and 11b constituting the securing member 11 are each provided with female screws 18 for meshing with the male screw 1a of the rod 1. The surfaces of the members 11a and 11b are each further provided with a semicircular groove 19 adjacent to the external sides of the female screws 18, so that the semicircular groove 19 is engaged with a half peripheral portion behind the male screw 1a of the rod 1 along a predetermined length (FIG. 4). Each semicircular groove 19 is provided at an intermediate portion thereof with a raised portion 20 for engaging with the flat portion 1b. In order to reinforce the unity between the members 11a and 11b and to permit the male screw 1a of the rod 1 to be held by the member 11b, the female screw 18 of the member 11b is permitted to accommodate slightly more than half the periphery of the male screw 1a and both side walls 21 of the female screw 18 of the member 11b are extended upward, while the female screw 18 of the member 11a is permitted to accommodate slightly less than half the periphery of the male screw 1a and is formed at both sides thereof with slits 22 in which the side walls 21 of the member 11b are engaged. The aforementioned snap catches 16 are disposed along the outer margins of the slits 22, whereas the retaining portions 17 are disposed along the outer margins at the lower parts of the side walls 21.

Accordingly, in order to hold the rod 1 by the member 11b, the flat portion 1b of the rod 1 is brought to face the raised portion 20 of the member 11b and the male screw 1a is pushed in between the side walls 21 to be engaged in the female screw 18. Then, if the pair of spring pieces 13a and 13b are folded along the thin portion 12 and if the member 11a is folded over the other member 11b, the side walls 21 are inserted into the slits 22, pushing away the snap catches 16. At the same time, the female screw 18 of the member 11a is inserted into between the side walls 21. In this way, when the female screw 18 of the member 11a is brought to be engaged with the male screw 1a in the female screw 18 of the member 11b and when the raised portion 20 is brought to be engaged with the other flat portion 1b of the rod 1 to bring the members 11a and 11b face-to-face with each other and pressure welded, the snap catches 16 are brought to be engaged with the retaining portions 17, thereby to combine the members 11a and 11b. In this combined state, the female screw 18 of the member 11a and the female screw 18 of the other member 11b accommodate the entire periphery of the male screw 1a of the rod 1.

In this way, since the rod can be held by one member and, in the meantime, since the other member can be folded thereon, the assembly work can be efficiently performed. Moreover, the rod 1 does not escape from the securing portion 11 and is not pivoted with respect to the securing portion 11. In this way, when the pivotal attaching device is secured to a first member or the rod 1, the metal shaft 5 having a head is thrust into the openings 14 formed in the pair of spring pieces 13, then the openings of a second member or the cam levers 7b and 7a are fitted to the leading end portion of the shaft, and then the leading end portion of the shaft is enlarged by calking. In this case, the pair of spring pieces 13a and 13b are slightly pressed between the undersurface of the head of the shaft 5 and the upper-surface of the cam lever 7b to make the space between the pair of spring pieces 13a and 13b narrow.

By this, the loosening of the shaft 5 in the thrusting direction can be prevented by the restoring force of the spring pieces 13a and 13b. Moreover, when a force is applied in the twisting direction when the rod is being pushed or pulled, the pair of spring pieces 13a and 13b are elastically deformed to absorb the twisting force. As a result, the rod 1 can be operated without trouble. Moreover, since the metal shaft 5 is thrust into the openings 14 of the pair of spring pieces which are molded of plastic, no noise is generated thereby.

Moreover, if the securing portion 11 and the forked leaf spring portion 13 are formed in a developed state as discussed in this embodiment, the device can be molded by using an inexpensive mold. In order to facilitate easy assembling, the upper end 21' of each side wall 21 is preferably formed in a conical shape so that it can be inserted into the slit 22 by pushing away the snap catches 16.

Although the opening 14 formed in each spring piece 5 is an elongated opening so that the rod can be moved in the longitudinal direction therealong, it may of course be a circular opening having a slightly larger diameter than that of the shaft.

Figure 15:
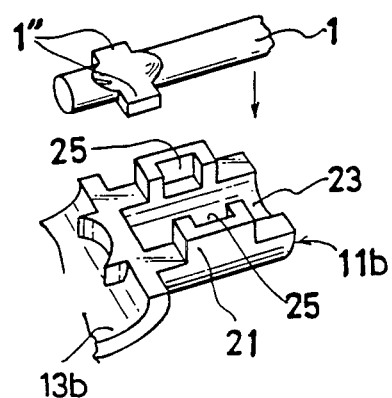
FIG. 15 is a perspective view showin a part of still another embodiment of a securing portion of a pivotal attaching device according to the present invention.
Figure 14:
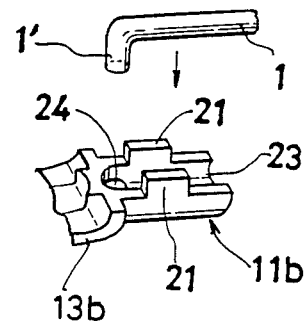
FIG. 14 is a perspective view showing a part of another embodiment of a securing portion of a pivotal attaching device according to the present invention.
Figure 16:
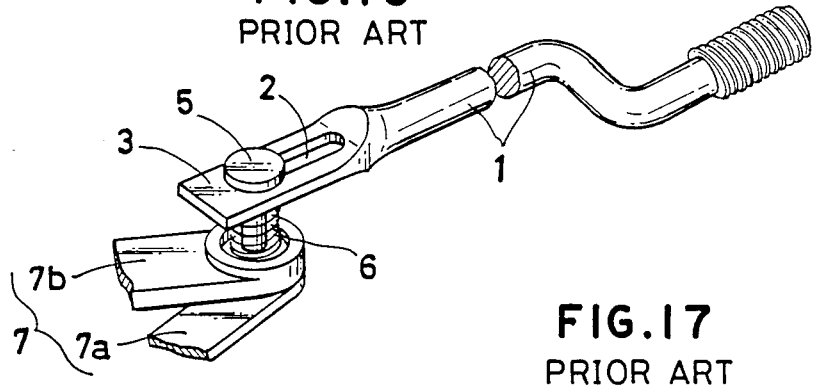
FIG. 16 is a perspective view of a conventional linkage mechanism.
Figure 17:
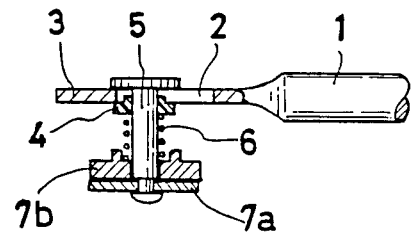
FIG. 17 is a partly sectional view of the linkage mechanism of FIG. 16.

As a modification of the device provided on the rod 1 for preventing the rod 1 from escaping from the securing portion 11 or from rotating with respect to the securing portion as discussed with reference to FIG. 3, for example, the leading end portion of the rod 1 may be bent at a right angle as shown in FIG. 14 or the rod 1 may be provided with a flat portion at a place slightly behind the leading end and, at the same time, the flattened portion may be expanded laterally as shown in FIG. 15.

That is, in another embodiment of FIG. 14, one of the two members 11b constituting the securing portion 11 in an opposing state is formed with an opening 24 for permitting a right angle bent portion 1' of the rod 1 to be inserted therein, at the foremost end of a semicircular groove 23 for permitting a generally half periphery of the rod to be fitted therein formed in the opposing surface. Of course, the corresponding surface of the other member 11a may be provided only with a semicircular groove for permitting a generally half periphery of the rod to be fitted therein.

In a still another embodiment shown in FIG. 15, an opposing surface of one member 11b is provided with a semicircular groove 23 for permitting a generally half-periphery of the rod to engage therein, whereas the opposing inner surfaces of the side walls 21 are formed with grooves 25 for accommodating the laterally expanding portions 1" of the rod. And, the other member 11a is provided with a pair of projections formed in the slits 22 so that, when the member 11a faces the other member 11b, the projections enter into the grooves 25 from above and press the laterally expanded portions 1" against the bottoms of the grooves 25.

The flat portion 1b, the right angle bent portion 1' and the laterally expanded portions 1" provided on the rod 1 are adapted to prevent the rotation of the rod with respect to the securing portion, thereby to regulate the direction of, for example, the other end portion of the rod. Where regulation of the direction of the rod is not required, only the male screw 1a may be provided merely to prevent the rod from escaping in the axial direction from the securing portion.

The device according to the present invention can be simply secured to one end of a rod in order to pivotally attach a cam lever thereto without using such parts as a coil spring or a grommet washer. Moreover, the generation of noise and the loosening of the shaft can be prevented. In addition, even if a twisting force is applied to the rod, such force can be effectively absorbed so as to permit the rod to be pushed or pulled without trouble.

What is claimed is:

1. A combination comprising an attaching device for pivotally attaching a first member to a second member; said second member being pivotally attached to said attaching device; said first member being fixably attached to said attaching device; a shaft member pivotally attaching said attaching device to said second member; said attaching device further comprising a securing portion for securing said attaching device to said first member, and a leaf spring portion including a pair of spring pieces being connected to said securing portion and maintaining a space therebetween, at least one of said spring pieces being a flexure leaf spring, said securing portion and said leaf spring portion being integrally molded of plastic, said pair of spring pieces each being formed with an opening through which said shaft extends, and said spring pieces being compressed between said shaft and said second member.

2. An attaching device for pivotally connecting a first member to a second member comprising: a securing portion being connectable to said first member; a leaf spring portion connectable to said second member and including at least a pair of spring pieces connected to said securing portion and maintaining a space therebetween, at least one piece of said pair of spring pieces being a flexure leaf spring, and said pair of spring pieces having openings formed therethrough wherein a shaft directly connects said leaf spring portion to said second member.

3. A device as described in claim 2, wherein said leaf spring portion comprises two opposed flexure leaf spring pieces being integrally molded of plastic with said securing portion.

4. A device as described in claim 2, in which said shaft, when inserted through said openings in said pair of spring pieces and connected to said second member, compresses said pair of spring pieces for promoting a rattle-free connection.

* * * * *